WIDE BAND FREQUENCY DISCRIMINATOR EMPLOYING A CONSTANT DELAY

Filed Feb. 9, 1965 3 Sheets-Sheet 1

INVENTOR.
Alfred Neuburger
BY
Roberts, Cushman & Grover,
ATT'YS.

July 9, 1968 A. NEUBURGER 3,392,337

WIDE BAND FREQUENCY DISCRIMINATOR EMPLOYING A CONSTANT DELAY

Filed Feb. 3, 1965 3 Sheets-Sheet 3

United States Patent Office 3,392,337

Patented July 9, 1968

3,392,337
WIDE BAND FREQUENCY DISCRIMINATOR EMPLOYING A CONSTANT DELAY

Alfred Neuburger, Brighton, Mass., assignor, by mesne assignments, to Continental Electronics Manufacturing Company, Dallas, Tex., a corporation of Texas Filed Feb. 9, 1965, Ser. No. 431,267
4 Claims. (Cl. 329—145)

ABSTRACT OF THE DISCLOSURE

A frequency discriminator, of the type converting a frequency deviation to a related phase deviation which is then converted to an amplitude deviation, has a delay time for retarding the input signal a fixed interval (preferably one-fourth the period of the center frequency signal) and a phase detector for comparing the delayed signal with the input signal to produce an output having its amplitude related to the phase difference. In one described embodiment, the input signal is squared by a limiter, the delayed signal is squared and rectified by a limiter-rectifier, and the two resulting signals are applied to a gate, the output of which is then averaged by a low pass filter to produce an amplitude linearly related to frequency difference.

The field of this invention is that of electrical conversion devices, and more particularly of apparatus for wide band frequency discrimination.

Heretofore, frequency discriminators with tuned circuits have been used to convert a frequency deviation to a related phase deviation which is converted with a phase detector to a relative amplitude deviation. The so-called Foster-Seeley circuit, a typical example of existing frequency discriminators, uses a double-tuned transformer with the secondary voltage 90° out of phase from the primary at resonance. The primary and secondary voltages applied as inputs to a phase detector yield a zero volt output at resonance, and they yield appropriate output amplitude variations corresponding to signal frequency deviation from resonance. The linearity of all frequency discriminators using tuned circuits depends upon the linearity of the frequency versus phase characteristic of the tuned circuit. Generally speaking incorporation of a tuned circuit into a frequency discriminator allows only a relatively small frequency deviation before severe non-linearity and consequent distortion occur. In addition, the tuned circuit must be precisely adjusted to achieve a minimum amount of distortion over its narrow operating range.

Objects of this invention are to provide circuitry for converting frequency deviation to related amplitude deviation which is simple in design, has a minimum amount of non-critical adjustments, and has high linearity; to provide such circuitry that is capable of converting a large range of frequency deviations into related phase deviations and amplitude variations; to provide a frequency discriminator having high linearity over a wide range of input signal frequency deviation; to provide frequency discrimination for which the maximum frequency deviation can be easily determined for any given linearity tolerance; to provide a discriminator for converting a large range of frequency deviations into related amplitude variations with a linear conversion factor that is limited only by band-pass characteristics of standard components; to provide a means for frequency discrimination having linear conversion characteristics over a range as large as ±100% of the center frequency; and to provide a wide band frequency discriminator of this type which is comparatively simple, rugged, and reliable in operation.

The nature and substance of the invention can be shortly characterized as involving a comparison of the phases of a signal and of a delayed portion of itself; apparatus for carrying out this concept according to the invention comprises a frequency discriminator which employs a delay line responding with an output signal that conforms to, but is delayed a fixed interval or time lag relatively to the input signal, in combination with a phase detector which furnishes output signal amplitude variations that are proportionate to the phase differences between input signals conforming to the output of the delay line and to the original input signal. The linearity of the amplitude modulation of the final output signal depends mainly on the delay line and is accordingly determined by the favorable properties in this respect of the delay line. The delay period is preferably a fixed portion of the one-cycle period of the center frequency of the input signal.

In an important aspect, the phase detector includes limiters for squaring sine waves interposed between the delay line output and the original input signal, and the two input terminals of a gate respectively; preferably, the limiter which is directly on the original signal input includes a rectifier.

In a further important aspect, the phase discriminator according to the invention has a low-pass filter which attenuates high frequency components of the phase detector.

These and other objects and aspects of the nature of the invention will appear from the following description of its mode of operation and of several practical embodiments illustrating its novel characteristics.

The description refers to drawings in which.

Figure 1:
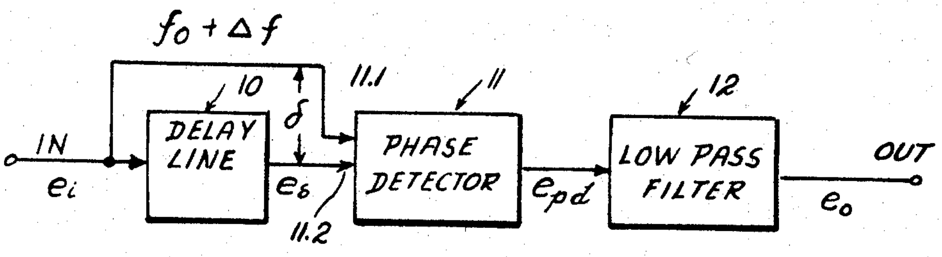
FIG. 1 is a block diagram of the basic circuitry according to the invention for comparing the phase of a signal with a delay portion of itself.

FIG. 1 illustrates the principle of the invention by way of a simple embodiment thereof. The block components represent a delay line 10, a phase detector 11, and a low-pass filter 12. The input and output terminals are designated IN and OUT, respectively. The frequency modulated signal $e_i$ to be converted is supplied to the input of delay line 10 and also, at 11.1 to one of the two inputs of the phase detector 11. The output of delay line 10 is supplied to the second input 11.2 of the phase detector 11. The output of phase detector 11 is supplied to a low-pass filter 12. The output $e_o$ of low-pass filter 12 represents the converted, amplitude modulated, signal.

The delay line can be of any conventional type which provides a fixed retardation between its input and its output. In this embodiment of the invention, the delay line has been conveniently chosen to provide a delay $\delta$ equal to one-fourth the period of one cycle of the input signal center frequency $f_o$, as indicated in block 10. However, it is to be understood that the invention is not limited to this particular delay.

The phase shift $\varphi_{de}$ of any signal $\omega$ passing through a delay line having a delay $\delta$ is given by the formula $\varphi_{de}=V\delta$. For a delay line having a delay $$\frac{1}{4f_o}$$

this formula becomes $$\phi_{de}=-\frac{\omega}{4f_o}$$

Figure 2:
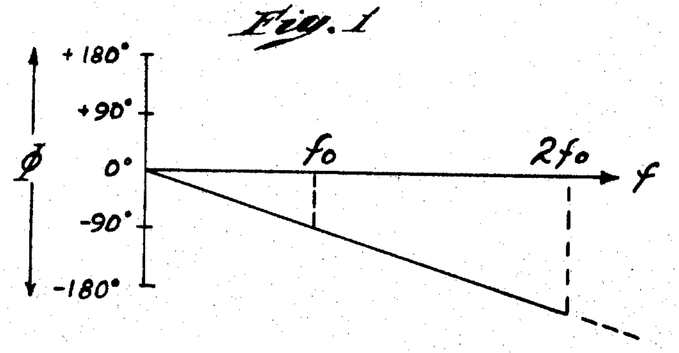
FIG. 2 is a diagram of the phase versus frequency characteristics of a delay line suitable for purposes of the invention.

These formulas define a linear relationship between frequency change and phase shift. FIG. 2 is a diagram illustrating this phase versus frequency characteristic of a delay line having the fixed delay $$\delta=\frac{1}{4f_o}$$

The relationship is linear, namely $$\phi_{de}=-\frac{\omega}{4f_o}$$

Figure 3:
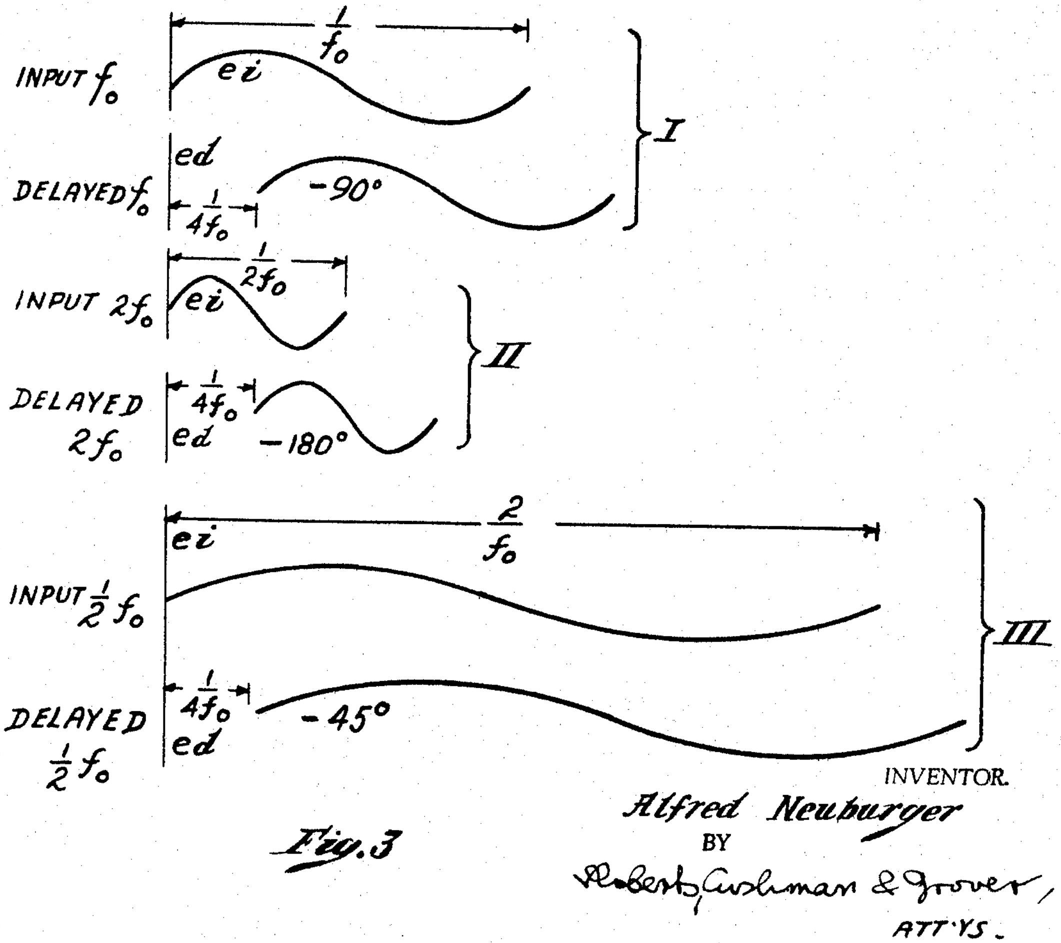
FIG. 3 is an illustration of the phase relationships between a signal and delay portions of that signal, as accomplished with circuitry according to FIG. 1.

FIG. 3 is a diagram illustrating by way of example the phase relationships of various input signals when the delay line has a fixed delay of $1/4f_o$ as above defined. It will be apparent that the wave forms of the direct input signal $e_i$ and of the delayed signal $e_d$ at various input frequencies on either side of $f_o$ will result in a phase detector output signal $e_{pd}$ which is proportionate to the frequency modulation.

When, as at I of FIG. 3, the input signal frequency is $f_o$, that is with no frequency deviation present, the delay line output $e_d$ lags the input $e_i$ by a time interval $1/4f_o$ while both input and output have the frequency $f_o$. The output therefore lags the input by ¼ the signal cycle period, or by −90°. When, as at II, the signal input frequency is $2f_o$, with +100% frequency deviation, the delay line output still lags the input by the same interval, $1/4f_o$. Now, the input and output have the frequency $2f_o$, or a cycle period one-half that of the $f_o$ cycle period. The output lags the input in this case by ½ the signal cycle period, or by −180°. Similarly when, as at III, the input signal is $\frac{1}{2}f_o$, the delay remains the same. In this case, the input and output have the frequency $\frac{1}{2}f_o$, or a cycle period twice the $f_o$ cycle period. The output lag in this case is ⅛ that of the signal cycle period, or −45°, as indicated at III of FIG. 3. It will be noted that the three wave trains I, II, III, are related to a single instance of time designated by the vertical line common to all three groups of waves.

Referring back to FIG. 1, the signal input frequency (which may be designated $f_o+\Delta f$, that is, center frequency plus change or frequency deviation) and the output of delay line 10 are simultaneously applied to the two inputs 11.1 and 11.2, respectively of phase detector 11. This phase detector can be any standard circuit designed to yield an output related to the phase difference between its inputs. Two sine-wave input signals from a delay line with delay $\delta=\frac{1}{4}f_o$ yield an output $e_{pd}$ from such a phase detector which is proportioned to the frequency according to the expression $$e_{pd}\sim\cos\omega t\cos\left(\omega t-\frac{\omega}{4f_o}\right)$$

Taking only the difference term, namely the low frequency term, of this equation gives:

$$e_{pd}\sim\cos\left(-\frac{\omega}{4f_o}\right)=\cos\frac{\omega}{4f_o}$$

In terms of frequency deviation $f$ from center frequency $f_o$, this last equation becomes:

$$e_{pd}\sim\cos\frac{2\pi(f_o+\Delta f)}{4f_o}=-\sin 2\pi\frac{\omega}{4f_o}$$

Thus it will be seen that this phase comparison of sine-waves yields an output signal having a non-linearity defined by a sine function.

Linearity of the phase detector output may be specified within any selected tolerance of $p\%$ as follows. If $X_p$ is the value of X, in radians, for which X is $p\%$ from sin X, then it is necessary to determine the value $X_{p\ max}$ for which sin X is within $p\%$ of X. The formula for maximum frequency deviation for $p\%$ linearity is:

$$\Delta f_{p\ max.}=\pm\frac{4X_pf_o}{2\pi}=\pm\frac{2X_pf_o}{\pi}$$

where $X_p$ is the value of X in radians for which X is $p\%$ from sin X. This yields, in terms of maximum fractional frequency deviation in percent from $f_o$, the relation $$\frac{\Delta f_{p\ max.}}{f_o}\times 100=\pm\frac{200\ X_p}{\pi}$$

The maximum fractional frequency deviation can be tabulated as follows for three values of $p$.

| p in percent | $X_p$ in radians | $X_p$ in degrees | Max. Freq. Dev. in percent |
|---|---|---|---|
| 1 | 0.25 | 14 | 16 |
| 2 | 0.35 | 20 | 22 |
| 5 | 0.55 | 32 | 35 |

Figure 4:
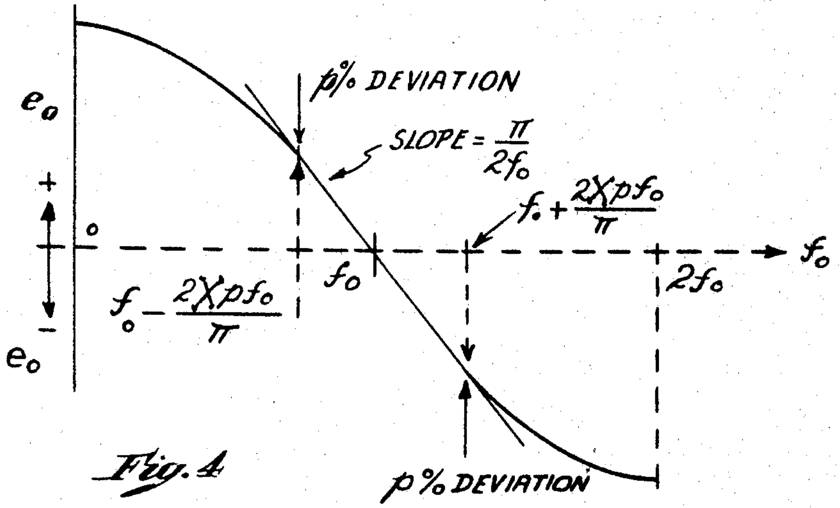
FIG. 4 is a diagram of the discriminator characteristics of circuitry according to FIG. 1.

FIG. 4 is a diagram of the discriminator characteristics of the embodiment of FIG. 1. The sensitivity of this embodiment is:

$$\frac{\Delta e_o}{\Delta f}=-\frac{\pi}{2f_o}$$

Inasmuch as this invention can be used for as much as 100% frequency deviation, the sensitivity is relatively low.

Figure 5:
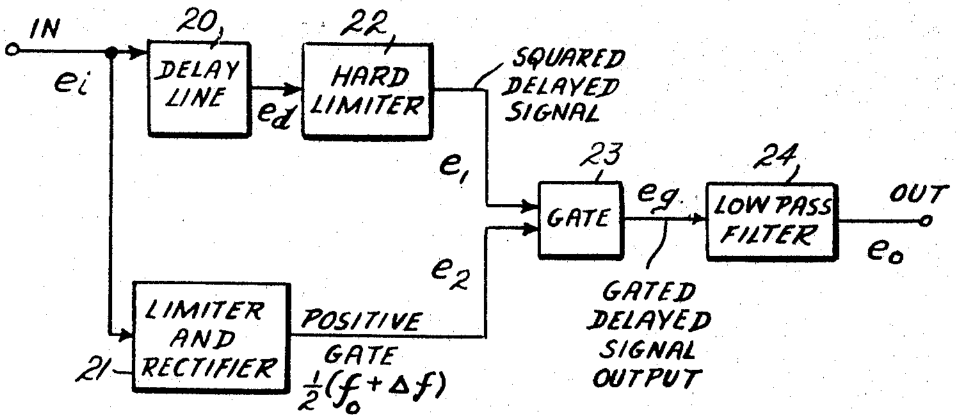
FIG. 5 is a block diagram of a second embodiment of the invention adapted to provide extended linearity.

The linearity of frequency versus phase detection can be extended by modifying the circuitry within the concept of the invention, for example by employing the embodiment shown in FIG. 5. In this embodiment, sine waves are converted to square waves, and phase detection is then accomplished by gating. This method eliminates the non-linearity which is inherent in sine-wave phase detection, as discussed above. The only remaining limitations on linearity in the embodiment of FIG. 5 are the band-pass characteristics of the components employed, such as that of the delay line. For ideal components, linearity of frequency to amplitude conversion is theoretically extended to ±100%.

As shown in FIG. 5, the signal input $e_i$ of frequency $f_o+\Delta f$, is supplied to the delay line 20 as well as to a limiter-rectifier 21, both of conventional design. The output $e_2$ of the limiter-rectifier 21 is a square wave having an output potential ranging from zero to some positive voltage. The positive output half-cycles of 21 correspond as to time interval to the positive half-cycles of the $f_o+\Delta f$ input signal. The negative input signal half-cycles appear as zero potential in the output of limiter-rectifier 21. In other words, this output is a positive gate having a period of $\frac{1}{2}(f_o+\Delta f)$.

The delay line output lags $1/4f_o$ behind the input signal as set forth above with reference to FIG. 1. This output is converted by a conventional hard limiter 22 into a square wave signal $e_1$ having positive and negative peaks, and whose leading edge and trailing edge configurations correspond to sine-wave zero crossings. The leading edge of the squared delay signal from limiter 22 is always delayed $1/4f_o$ from the leading edge of the gate signal output of limiter-rectifier 21. The positive gating signal $e_2$ from block 21 and the squared and delayed signal $e_1$ from block 22 are applied to a gate block 23 of conventional construction. The gate block 23 is designed to produce zero output at times of zero level in the gate signal, and to pass the squared delay signal $e_g$ when the level is positive.

Figure 6:
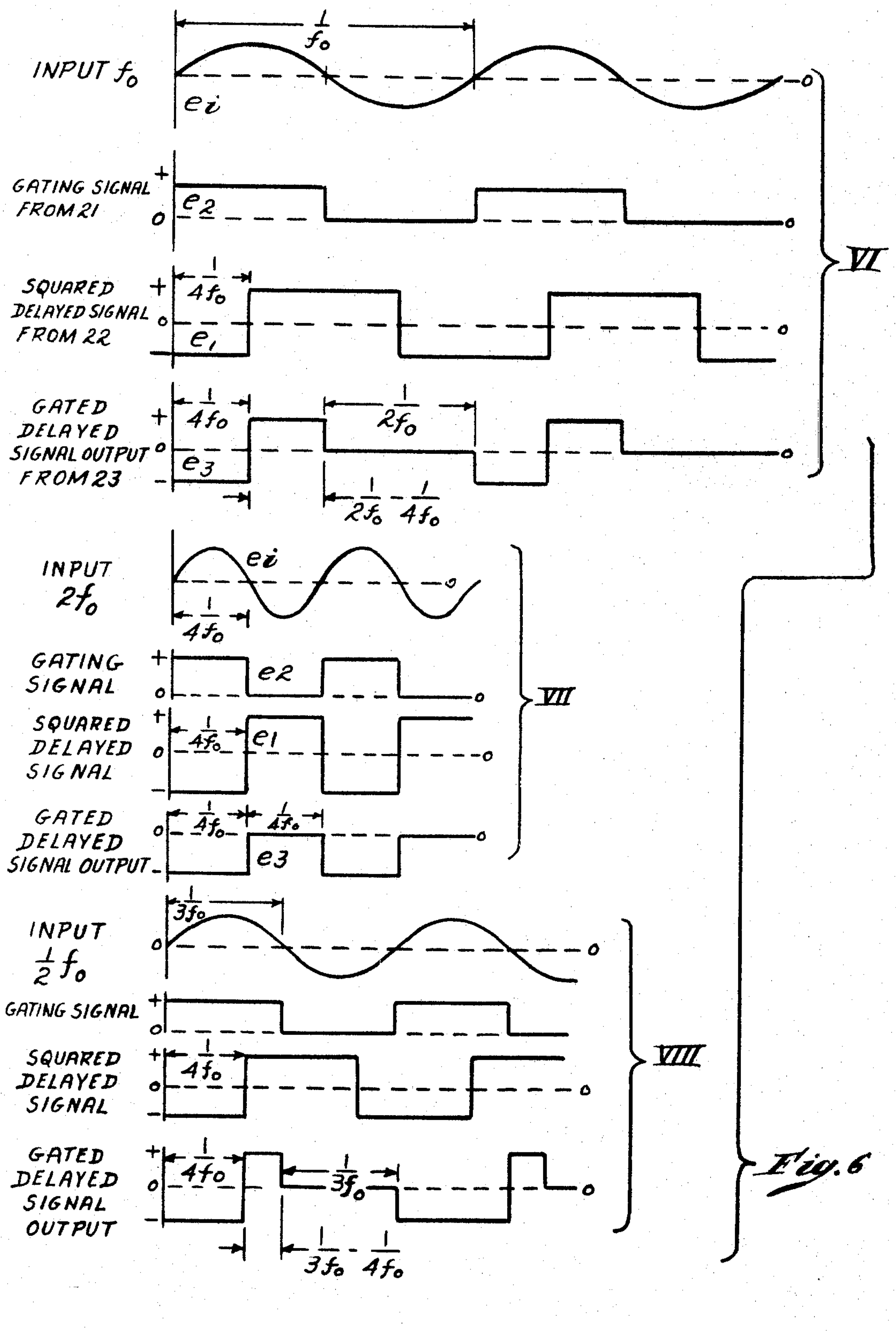
FIG. 6 is a diagram similar to FIG. 3 showing the phase relationships throughout the course of the embodiment according to FIG. 5.

The diagrams of FIG. 6 illustrate, similar to FIG. 3, the relative wave shapes of outputs for signal input $f_o$ (VI, no deviation); signal input $2f_o$ (VII, 100% lag); and signal input $\frac{1}{2}f_o$ (VIII, 50% lag).

The output $e_g$ of gate block 23 is filtered by a low-pass filter 24 to produce the average of the signal levels. The output of filter 24 is $e_o$, the frequency discriminator output, whose amplitude is linearily related to the frequency deviation of the input signal with center frequency $f_o$. This filtered output, $e_o$, is the ratio of the peak positive interval minus the peak negative interval, to the signal frequency period. Mathematically, this may be expressed in the following terms:

The peak positive interval equals the period of the gating signal minus the delay; mathematically $$1/2(f_o+\Delta f)-\frac{1}{4f_o}$$

The peak negative interval is $\frac{1}{4}f_o$ inasmuch as the gating signal always leads the delay signal by that interval. The signal frequency period is $1/(f_o+\Delta f)$. Therefore:

$$e_o \sim \frac{\left[\frac{1}{2(f_o+\Delta f)}\right]-\frac{1}{4f_o}-\frac{1}{4f_o}}{\frac{1}{f_o+\Delta f}}$$

This reduces to:

$$e_o \sim -\frac{f}{2f_o}$$

The sensitivity of this embodiment is:

$$\frac{\Delta e_o}{\Delta f}=-\frac{1}{2f_o}$$

Figure 7:
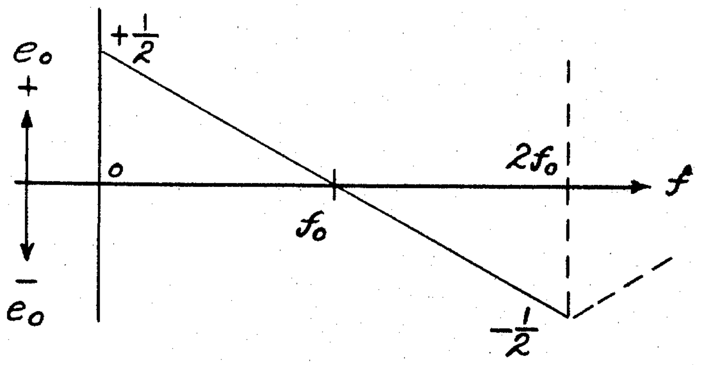
FIG. 7 is a diagram of the discriminator characteristics of circuitry according to FIG. 5.

FIG. 7 is a diagram illustrating the discriminator characteristics of the embodiment of FIG. 4. It is analogous to FIG. 2, and therefore needs no further explanation.

It will now be evident that the present invention, especially in its embodiment according to FIG. 5, provides a frequency discriminator which is linear over a wide range of frequencies which can be selected and extended to suit particular requirements.

It should be understood that the present disclosure is for the purpose of illustration only and that this invention includes all modifications and equivalents which fall within the scope of the appended claims.

I claim:

1. A linear wide band frequency discriminator comprising:

a delay circuit responsive to a frequency modulated input signal for delaying its output signal by a fixed proportion of the center frequency single cycle period of said input signal; and linear phase detector means including first limiter means for squaring the output signal of said delay line, second limiter means for squaring said input signal, and gate means responsive to said first and second limiter means, said gate means being gated by a half cycle of one of said limiter squared input signals to pass the other of said limiter squared input signals, whereby the average output amplitude of said gate means is a linear function of frequency.

2. Frequency discriminator according to claim 1 wherein said second limiter means comprises rectifier means for furnishing a rectified square wave output to said gate means.

3. Frequency discriminator according to claim 1, further comprising a low-pass filter responsive to the output of said gate to average its output.

4. Frequency discriminator according to claim 1, wherein the retardation of said delay line is one-quarter of the single-cycle period of the input signal center frequency.

References Cited

UNITED STATES PATENTS

| | | | |
|---|---|---|---|
| 2,580,148 | 12/1951 | Wirkler | 329—145 X |
| 3,022,461 | 2/1962 | Wilcox | 329—145 X |
| 3,320,540 | 5/1967 | Ogi et al. | 329—145 X |

ALFRED L. BRODY, *Primary Examiner.*